Patented Mar. 3, 1925.

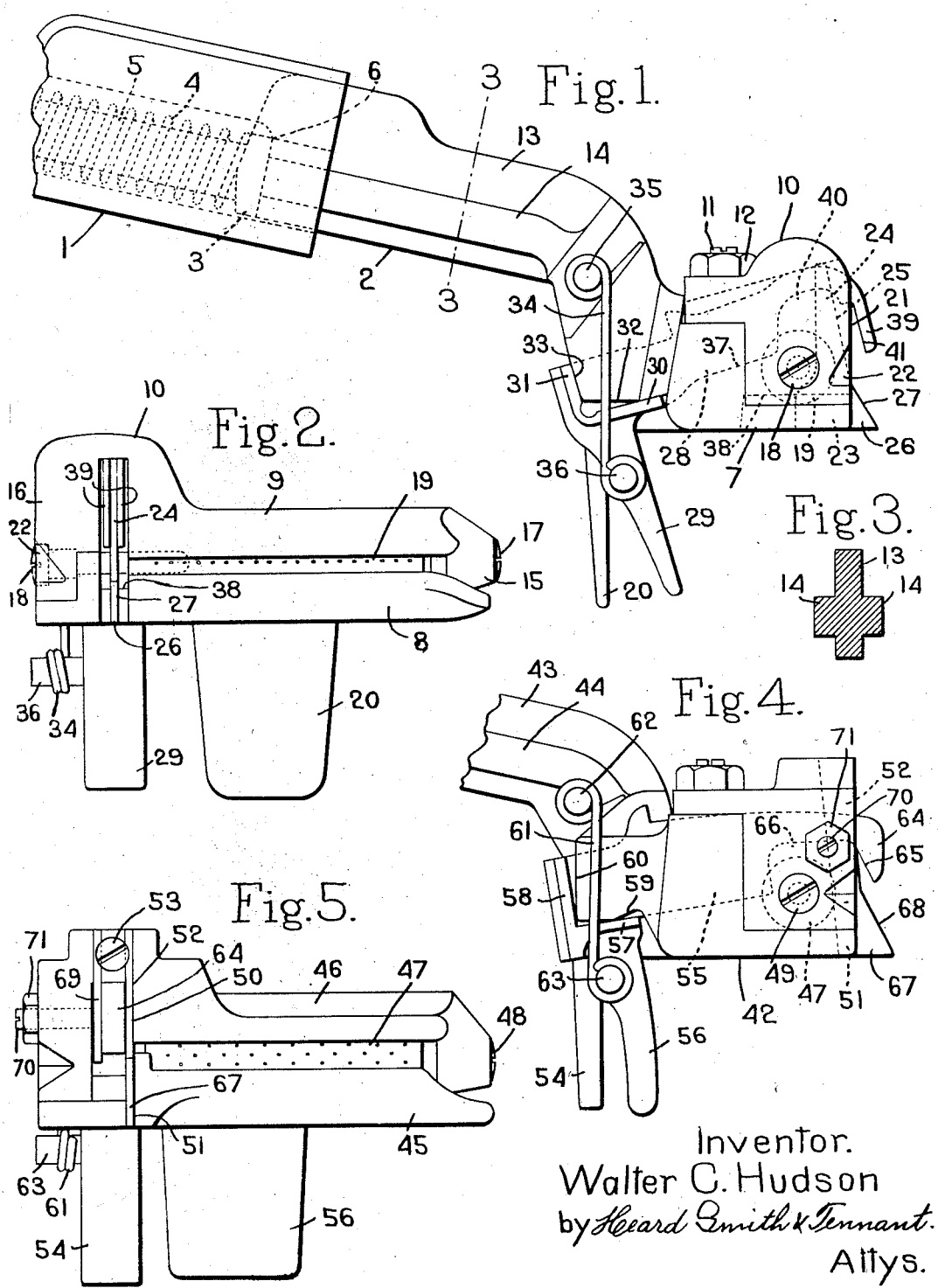

1,528,550

UNITED STATES PATENT OFFICE.

WALTER C. HUDSON, OF ANDERSON, SOUTH CAROLINA, ASSIGNOR TO DRAPER CORPORATION, OF HOPEDALE, MASSACHUSETTS, A CORPORATION OF MAINE.

THREAD-CUTTING TEMPLE FOR LOOMS.

Application filed September 11, 1923. Serial No. 662,114.

*To all whom it may concern:*

Be it known that I, WALTER C. HUDSON, a citizen of the United States, and a resident of Anderson, county of Anderson, State of South Carolina, have invented an Improvement in Thread-Cutting Temples for Looms, of which the following description, in connection with the accompanying drawing, is a specification, like characters on the drawing representing like parts.

This invention relates to loom temple constructions in general and more particularly to thread cutting temples for looms and the principal object of the invention is to provide a thread cutting temple having cutting members which will engage the filling with certainty and sever the same with a shearing cut.

A further object of the invention is to provide a thread cutting temple construction in which the rocking and sliding movable cutter is so constructed that it cannot engage and wear the supporting stud for the temple roll notwithstanding any wear which may occur upon the rocking and sliding member or the ways in which it is mounted.

A further object of the invention is to provide a loom temple with a novel form of slide bar of a more rigid construction than heretofore produced.

These and other objects and features of the invention will more fully appear from the following description and the accompanying drawings and will be particularly pointed out in the claims.

In the drawings:

Fig. 1 is a side elevation of a thread cutting temple for looms of the well known "Dutcher" type having the invention embodied therein;

Fig. 2 is a rear elevation of the head portion of the temple illustrated in Fig. 1;

Fig. 3 is a transverse sectional view through the slide bar of the loom temple on line 3—3 Fig. 1;

Fig. 4 is a side elevation of a different form of loom temple embodying the invention; and, Fig. 5 is a rear elevation of the head of the temple illustrated in Fig. 4.

The loom temple construction illustrated in the accompanying drawing comprises a temple stand 1 having suitable ways in which the slide bar 2, which supports the temple head, is reciprocably mounted, the slide bar being provided with a shouldered portion 3 which is normally pressed, by a helical spring 4 surrounding an extension 5 on said slide bar, against the inner face of the end 6 of the temple stand 1. The free end of the slide bar 2 is downwardly offset and has formed integral therewith the lower portion 7 of the temple head which includes the usual pod 8. The head of the temple also comprises a cap 9 which is provided at its outer portion with an upwardly extending boss 10 which, in the present invention, projects upwardly higher than those of usual temple constructions to provide room for the particular type of rocking and sliding cutting member as will hereinafter more fully appear.

The cap 9 is secured to the temple head by a screw 11 and a lock nut 12 in the usual manner.

One of the features of the present invention consists in providing a more rigid slide bar construction than heretofore which will be less likely to be broken by the continued heavy shocks produced by the beating up of the lay.

In the particular construction illustrated the slide bar 2 comprises a vertical web 13 provided with integral longitudinally extending ribs 14 which desirably are of rectangular cross section, said ribs extending from the usual thickened offset portion forming part of the head to the shouldered portion 3 which abuts against the inner face of the end 6 of the temple stand. The end portion 6 of the temple stand desirably is provided with suitable ways to embrace the ribs 14. By reason of this construction a much more rigid slide bar is produced which will be practically free from breakage.

The cap 9 of the temple head is provided at its inner and outer ends with the usual downward extensions 15 and 16 in which are mounted respectively the studs 17 and 18 upon which the toothed temple roll 19 is rotatably mounted.

The temple head is provided with the usual downwardly extending heel 20 which is engaged by the lay upon its beat-up and through it the temple is forced forwardly toward the breast beam of the loom against the action of the spring 4. The temple head presents the usual substantially flat face 21 having at its outer end a V-shaped recess 22 which receives the filling strand which runs from the selvage of the cloth to the shuttle. In usual thread cutting temples of this type the cutting mechanism comprises a vertical cutter having an edge which is substantially flush with the vertical face 21 or which inclines slightly forwardly therefrom and a rocking and sliding cutting member having a blade the edge of which extends downwardly and rearwardly with respect to the vertical face 21 during the sliding movement of the cutter after the same has been rocked to sliding position, the object of the rearward inclination of the cutting edge being to produce a shearing cut. Such rearward inclination of the edge of the movable cutting blade has a tendency to force the filling downwardly and beyond the effective portion of the blade.

The principal object of the present invention is to provide co-operating stationary and movable cutting members of such construction that the filling will be severed with certainty by a more effective shearing action. This is accomplished in the present construction by providing the vertical stationary cutting blade with an extension presenting a downwardly and rearwardly inclined cutting edge preferably projecting beyond the face of the temple head, the downwardly and rearwardly extending edge thereby tending to raise the filling as it is engaged by the movable cutting blade so that the cutters will act upon the same with greater certainty.

In the construction illustrated herein the stationary cutting member 23 consists of a flat steel blade which is mounted at one side of a vertical recess in the head of the temple adjacent to the outer end of the toothed roll 19 and held in position by any suitable means. The stationary cutter comprises an upper portion 24 which extends well up into the recess in the pod and preferably is provided with an edge 25 which inclines forwardly from the face 21 of the temple head. The lower portion of the stationary cutter 23 is provided with an extension 26 which presents a downwardly and rearwardly extending edge 27 which projects beyond the plane of the temple face 21. The rocking and sliding co-operating movable cutter may be of the usual type within the broad scope of the present invention.

A further object of the invention is to provide an improved rocking and sliding cutting member so constructed that it will not by any possibility engage and wear the supporting stud of the temple roll during its movement and also to provide the rocking and sliding member with a specially designed, preferably duplex, cutter to co-operate with the stationary cutting blade.

In the construction illustrated herein the rocking and sliding cutting member 28 is mounted in the usual slots in the temple head and is provided with a downwardly extending heel 29 adapted to be engaged by the lay upon its beat-up. The rocking member 28 is provided with laterally extending flanges 30 and 31 which engage respectively shoulders 32 and 33 upon the forward portion of the temple head. The movable cutting member is normally held in place, as illustrated in Fig. 1, by the usual spring 34 which is coiled at one end about a stud 35 projecting from the side of the slide bar 14 and at its opposite end about a stud 36 which projects laterally from the side of the cutter heel 29. Upon the beat-up of the lay the heel 29 is engaged by the lay and as it is forced rearwardly the cutting member 28 is first rocked downwardly about shifting fulcrums produced by the sliding engagement of the flange 30 with the shoulder 32 and the flange 31 with the shoulder 33 until the lower horizontal edge 37 of the cutting member engages the horizontal way 38 in the cutter head after which the cutter is moved bodily rearwardly during the further movement of the lay. By this construction, therefore, the movable cutter is given first a rocking and then a sliding movement.

The free end of the rocking and sliding member 28 has secured to it or formed integral with it one, or preferably duplex cutting blades 39 which co-operate with the stationary cutter. Where duplex cutting blades are employed they are located upon opposite sides of the stationary cutter.

In the present construction the rocking and sliding member desirably is so constructed as to be tilted to a higher angle with respect to the base of the temple head than in usual constructions and is provided with a larger and higher recess 40 extending upwardly from the under face 37 thereof so that the stud 18, which supports the outer end of the toothed roll, cannot possibly be engaged by the rocking and sliding member by reason of any wear which may occur between said member and the support with which it engages, or by reason of excessive throw of the cutter due to the blow of the lay upon the heel 29.

The cutting blades 39, as illustrated in Fig. 1, are preferably so constructed that their cutting edges 41 will extend in substantial parallelism with the face 21 of the temple head as the rocking and sliding member 28 completes its rocking movement. By reason of this construction the edge 41 of the cutting blade will sweep downwardly around the filling during its rocking movement and during its sliding movement will draw the filling against the downwardly and rearwardly inclined edge of the portion 26 of the stationary cutting blade which projects beyond the face of the temple head so that the filling will be moved upwardly by the inclined edge 27 as it is drawn against the same and will be severed with a shearing cut.

It will be noted that in this construction the upward movement of the filling causes it to be engaged with certainty between the movable and stationary cutting blades and the severance thereof is thereby insured.

The invention is illustrated in Figs. 4 and 5 as applied to a different form of thread cutting temple of the type disclosed in the prior patent to Edward S. Stimpson, No. 1,366,034 granted January 18, 1921, which discloses a thread cutting temple for looms in which the cutter member is molded of a single integral piece of cast iron comprising a body and a heel projecting from one edge of the body and a chilled cutting blade projecting from another edge of the integral body with a cutting edge formed on the chilled portion.

In the construction illustrated in Figs. 4 and 5 the temple head 42 preferably is carried by a slide bar 43 having longitudinally extending strengthening ribs 44 of the character above described. In this construction the temple head 42 is provided with the usual pod 45, cap 46 and toothed roll 47 mounted upon studs 48 and 49 respectively in the manner above described. The stationary cutting blade 50 is mounted in alined slots 51 in the base of the temple head and 52 in the cap and is secured in place by a screw 53 seated in the cap. The temple head is provided with the usual downwardly extending heel 54 which is engaged by the lay upon its beat-up. The movable cutting member is of the rocking and sliding type comprising a body 55 of cast metal having an integral heel 56 projecting downwardly therefrom and laterally extending flanges 57 and 58 normally held against shoulders 59 and 60 respectively by a spring 61 which is mounted at its upper end upon a stud 62 projecting laterally from the slide bar 44 and wound at its lower end upon a stud 63 projecting laterally from the heel 56. The body 55 of the sliding member is provided with an integral cutting portion 64 which, as illustrated in Fig. 4, has a downwardly and rearwardly extending cutting edge 65 the blade portion of the member 65 being chilled to present a hardened cutting blade. The body of the member 55 is provided with a recess 66 of sufficient depth to avoid possibility of engagement with the stud 49 of the temple roll as heretofore stated.

The stationary cutting blade 51 in this construction is provided with a lower portion 67 which projects beyond the face of the temple head and presents a downwardly and rearwardly extending cutting edge 68 with which the edge 65 of the movable cutting blade co-operates in the manner heretofore described.

In this construction, as in that illustrated in Fig. 1, the inclination of the edge of the stationary cutting blade tends to raise the filling into the bite of the cutters and to insure the severance of the filling.

In the construction illustrated in Figs. 4 and 5 the movable cutting blade 64 is held tightly against the stationary cutter by a plate 69 which is mounted in a suitable slot in the cap and retained therein by the screw 53. A screw 70, which is mounted in the end of the cap, engages the side of the plate 69 and provides means for adjusting the plate laterally in such a manner as to produce proper co-operation between the edge 65 of the movable cutter and the stationary cutter. A lock nut 71 upon the screw 70 serves to retain it in adjusted position. The adjustment of the plate 69 is, however, disclosed in the prior patent to Stimpson and forms no part of the present invention.

By reason of the construction heretofore described, therefore, it will be seen that the present invention includes the provision of a novel slide bar of greater strength for supporting the temple head and also provides means for more certainly and effectively severing the filling and also includes means for preventing the rocking and reciprocating cutting member from engaging and wearing the stud which supports the temple roll.

It will be understood that the embodiment of the invention disclosed herein is of an illustrative character and is not restrictive and that various modifications in form, construction and arrangement of parts may be made within the spirit and scope of the following claims.

Having thus described the invention, what is claimed as new, and desired to be secured by Letters Patent, is:

1. A thread cutting temple for looms comprising a stationary cutting blade inclined relatively to the plane of the face of the temple head and a co-operating rocking and sliding blade operable to engage the filling and force it against the inclined edge of the stationary blade to produce a shearing cut.

2. A thread cutting temple for looms comprising a head, a stationary blade mounted therein projecting beyond the face of said head and presenting a downwardly and rearwardly inclined cutting edge and a rocking and sliding blade co-operating therewith.

3. A thread cutting temple for looms comprising a head having a vertical face, a stationary blade having an upwardly and slightly forwardly inclined edge portion adjacent said temple face and a downwardly and rearwardly more abruptly inclined edge portion extending beyond said face and a co-operating rocking and sliding blade operable to engage the filling and force the same against the edge of the stationary blade to produce a shearing cut.

4. A thread cutting temple for looms comprising a head having a vertical face, a stationary cutting blade having a portion projecting beyond the face of said head and presenting a downwardly and rearwardly inclined cutting edge and a rocking and sliding member having a co-operating cutting blade movable by its rocking movement into substantial parallelism with and beyond said vertical face to grasp the filling and during its sliding movement to force the filling against the inclined stationary blade to produce a shearing cut.

5. A thread cutting temple for looms having a head comprising a pod and a cap mounted thereon and having a vertical face, a vertical stationary blade having a portion extending upwardly across the space between the cap and the pod and a downwardly and rearwardly inclined portion projecting beyond the face of the temple head below the space between the cap and pod and a rocking and sliding member having a duplex cutter co-operating with said stationary blade.

6. A thread cutting temple for looms having a head comprising a pod and a cap mounted thereon provided with downwardly extending end portions, a roll mounted upon studs seated in said end portions, a stationary cutter located adjacent the outer end of said roll and having a downwardly and rearwardly inclined edge portion projecting beyond the face of said head, a rocking and sliding member having a recess of sufficient depth to prevent engagement of the rocking and sliding member with the roll-supporting stud notwithstanding any wear which may occur and having an elongated cutter positioned to extend in substantial parallelism with the face of the temple head during the reciprocating movement thereof and operable to engage the filling and force the same against the inclined edge of the stationary cutter to produce a shearing cut.

7. A loom temple construction comprising a temple stand, a temple head having a spring-actuated slide bar reciprocably mounted in said stand comprising an upright web having strengthening ribs located on opposite sides and extending longitudinally thereof.

8. A loom temple construction comprising a temple stand, a temple head having a spring-actuated slide bar reciprocably mounted in said stand comprising an upright web having longitudinally extending integral strengthening ribs rectangular in cross section and located on opposite sides of said web at a distance from the upper and lower edges thereof.

9. A temple head provided with a slide bar having a cross section substantially in the form of a Latin cross and a stand having ways in which said slide bar is reciprocably mounted.

In testimony whereof, I have signed my name to this specification.

WALTER C. HUDSON.